(12) United States Patent
Negri et al.

(10) Patent No.: US 11,661,970 B2
(45) Date of Patent: May 30, 2023

(54) SHAFT ASSEMBLY FOR AN AIRCRAFT TURBOMACHINE

(71) Applicant: SAFRAN AIRCRAFT ENGINES, Paris (FR)

(72) Inventors: Arnaud Nicolas Negri, Moissy-Cramayel (FR); Julien Fabien Patrick Becoulet, Moissy-Cramayel (FR); Michel Gilbert Roland Brault, Moissy-Cramayel (FR); Guillaume Patrice Kubiak, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 338 days.

(21) Appl. No.: 16/954,143

(22) PCT Filed: Dec. 20, 2018

(86) PCT No.: PCT/FR2018/053444
§ 371 (c)(1),
(2) Date: Jun. 16, 2020

(87) PCT Pub. No.: WO2019/122741
PCT Pub. Date: Jun. 27, 2019

(65) Prior Publication Data
US 2021/0164350 A1    Jun. 3, 2021

(30) Foreign Application Priority Data

Dec. 22, 2017    (FR) ...................................... 1763051

(51) Int. Cl.
*F16D 1/10*    (2006.01)
*F01D 5/02*    (2006.01)
*F02C 7/36*    (2006.01)

(52) U.S. Cl.
CPC ............. *F16D 1/101* (2013.01); *F01D 5/026* (2013.01); *F02C 7/36* (2013.01); *F16D 2001/103* (2013.01)

(58) Field of Classification Search
CPC . F01D 5/026; F02C 7/36; F16D 1/101; F16D 3/185; F16D 2001/103;
(Continued)

(56) References Cited

U.S. PATENT DOCUMENTS 2,886,358 A * 5/1959 Munchbach ............ F16D 1/116
403/359.5
4,348,956 A * 9/1982 Schmidlin ............. F16B 7/0413
403/359.5
(Continued)

FOREIGN PATENT DOCUMENTS

EP   1927774 A1   6/2008
FR   2918726 A1   1/2009
(Continued)

OTHER PUBLICATIONS

International Preliminary Report on Patentability received for PCT Patent Application No. PCT/FR2018/053444, dated Jul. 2, 2020, 12 pages (6 pages of English Translation and 6 pages of Original Document).
(Continued)

*Primary Examiner* — Josh Skroupa
(74) *Attorney, Agent, or Firm* — Womble Bond Dickinson (US) LLP

(57) ABSTRACT

A shaft assembly (22, 32) for an aircraft turbine engine (1), comprising a first outer shaft (32) and a second inner shaft (22), the first outer shaft being intended to be engaged axially on the second shaft and comprising inner longitudinal splines (34) for coupling with outer longitudinal splines (24) of the second shaft, characterised in that, when the first
(Continued)

and second shafts are in the coupling position, the inner and outer splines are engaged in one another and cooperate with each other in an axial coupling area (Z), the inner and outer teeth being situated outside this coupling area.

19 Claims, 4 Drawing Sheets

(58) Field of Classification Search
CPC ......... Y10T 403/7026; Y10T 403/7028; Y10T 403/7031; Y10T 403/7032; Y10T 403/7033; Y10T 403/7035
See application file for complete search history.

(56) References Cited

U.S. PATENT DOCUMENTS

| | | | | |
|---|---|---|---|---|
| 5,533,825 A | | 7/1996 | Stone | |
| 5,577,859 A | * | 11/1996 | Nau | F16D 1/116 403/359.2 |
| 5,716,156 A | * | 2/1998 | Bayer | F16D 1/072 403/359.6 |
| 6,482,094 B2 | * | 11/2002 | Kefes | F16D 1/06 403/359.4 |
| 7,387,462 B2 | * | 6/2008 | Hacker | F16D 1/072 403/359.1 |
| 7,481,711 B2 | * | 1/2009 | Fukumura | F16D 1/116 403/359.5 |
| 7,614,818 B2 | * | 11/2009 | Gutierrez | F16D 1/06 403/359.5 |
| 7,736,083 B2 | * | 6/2010 | Lescure | F16D 1/101 403/359.1 |
| 8,864,406 B2 | * | 10/2014 | Bolgar | F16D 1/108 403/359.1 |
| 9,476,459 B2 | * | 10/2016 | Lemmers, Jr. | F16D 1/116 |
| 9,649,933 B2 | * | 5/2017 | Oram | F16D 1/116 |
| 10,508,692 B2 | * | 12/2019 | Mabe | F16D 1/116 |
| 11,060,563 B2 | * | 7/2021 | Fabian | F16D 1/108 |
| 11,105,378 B2 | * | 8/2021 | Lee | F16D 1/116 |
| 2005/0254890 A1 | * | 11/2005 | Schulz | F16D 1/072 403/359.1 |
| 2008/0124168 A1 | | 5/2008 | Lescure et al. | |
| 2014/0116184 A1 | * | 5/2014 | Clark | F16D 1/116 74/492 |
| 2014/0119810 A1 | * | 5/2014 | Tinnin | F16D 1/116 403/20 |
| 2015/0323014 A1 | | 11/2015 | Clark et al. | |

FOREIGN PATENT DOCUMENTS

| | | |
|---|---|---|
| RU | 2273749 C1 | 4/2006 |
| RU | 2474709 C2 | 2/2013 |

OTHER PUBLICATIONS

Search Report received for Chinese Patent Application No. 201880084963.0, dated Apr. 2, 2022, 3 pages (1 page of English Translation and 2 pages of Office Action).
Search Report received for RU Patent Application No. 2020121632, dated Mar. 23, 2022, 2 pages of Original Document Only.
Written Opinion received for PCT Patent Application No. PCT/FR2018/053444, dated Mar. 25, 2019, 9 pages (4 pages of English Translation and 5 pages of Original Document).
International Search Report received for PCT Patent Application No. PCT/FR2018/053444, dated Mar. 25, 2019, 5 pages (2 pages of English Translation and 3 pages of Original Document).
Search Report received for RU Patent Application No. 2020121632, dated Mar. 23, 2022, 4 pages.

* cited by examiner

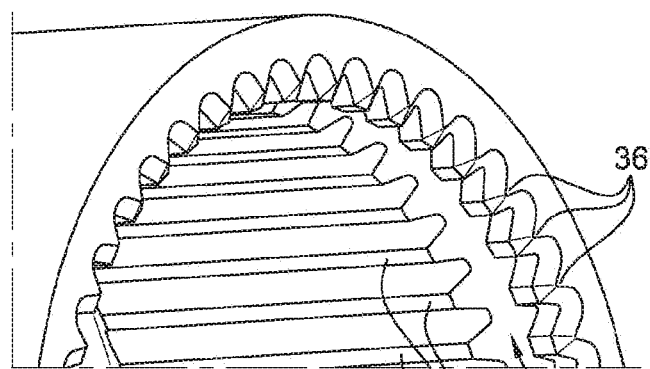
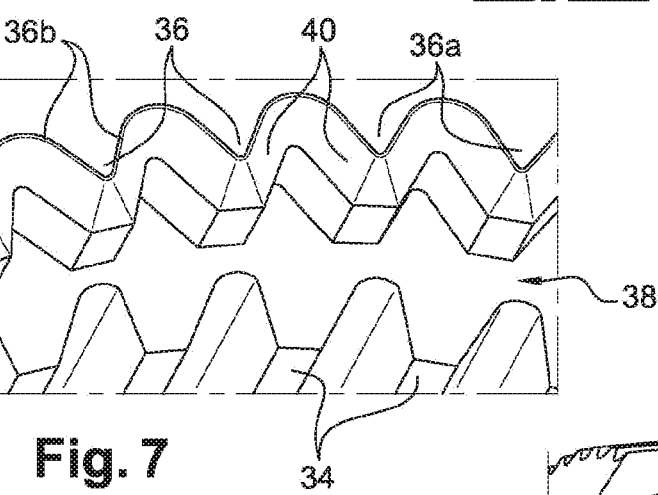
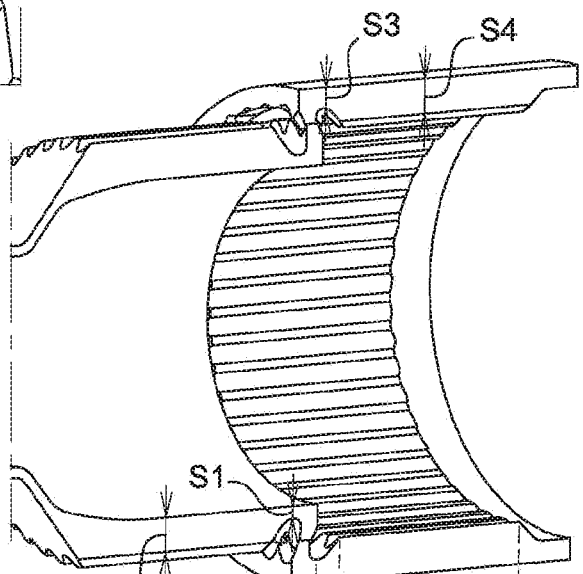
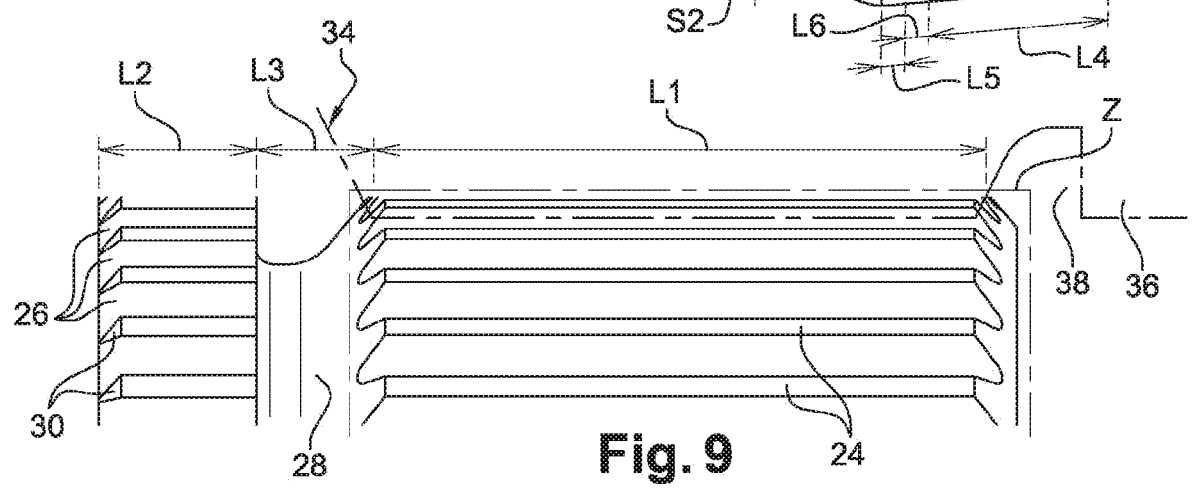

SHAFT ASSEMBLY FOR AN AIRCRAFT TURBOMACHINE

TECHNICAL FIELD

This invention relates to a shaft assembly for an aircraft turbomachine.

BACKGROUND

The prior art comprises in particular documents EP-A1-1 927 774, US-A1-2015/323014 and FR-A1-2 918 726.

In a conventional manner, a turbomachine comprises a gas generator and a fan situated at one end of the gas generator and surrounded by a fan casing. The fan is designed to generate an air flow, part of which feeds the gas generator and forms a primary flow, and another part flows between the gas generator and the fan casing and forms a secondary air flow that generates a major part of the thrust of the turbomachine.

The gas generator comprises, from upstream to downstream in the direction of gas flow, at least one compressor, one combustion chamber and at least one turbine. The role of the compressor is to increase the pressure of the air supplied to the combustion chamber. The role of the turbine is to drive the compressor in rotation by taking some of the pressure energy from the hot gases coming out of the combustion chamber and converting it into mechanical energy.

The compressor and the turbine are made up of a first assembly of fixed parts constituting the stator and a second assembly of parts, which can be rotated with respect to the stator, constituting the rotor.

The rotor of the compressor and the rotor of the turbine form an assembly integrally connected by a rotating shaft. The rotation of the rotor with respect to the stator is made possible by means of bearings, a bearing being a mechanical member supporting and guiding a rotor, in particular the shaft of this rotor. This bearing comprises a first part fixed to the rotor shaft and a second part fixed to the stator by means of a bearing support. A rolling bearing is arranged between the two parts of the bearing, allowing the rotation of one part of the bearing with respect to the other. The rolling bearing can be, for example, a ball, cylindrical roller or tapered roller type.

A turbomachine can also be of the "double-body" type, which means that it has two rotors arranged coaxially. A first body is called a low-pressure body and a second body is called a high-pressure body. In a known way, the gas generator comprises in this case, from upstream to downstream, a low-pressure compressor, a high-pressure compressor, the combustion chamber, a high-pressure turbine and a low-pressure turbine.

In the case of a turbojet engine with reduction gear, the low-pressure turbine shaft drives the fan shaft via a reduction gear which is lubricated and housed in an upstream lubrication enclosure. According to the type of reduction gear used, planetary or epicyclic, the fan shaft will rotate in the same direction or in the opposite direction of the turbine shaft, and the fan shaft will rotate at a lower speed than that of the turbine shaft.

In order to facilitate the mounting and dismounting of a turbomachine, it is preferable to design it in modules. The modules of a turbomachine are usually assemblies of parts which are fixed to each other. The modules carry out the various functions of the turbomachine: compressor, turbine, combustion chamber, equipment, etc.

In the case of a turbomachine with a reduction gear, the turbomachine comprises an upstream module comprising the fan shaft, bearing supports and the reduction gear. This upstream module is assembled on the low-pressure compressor to form a low-pressure module of the turbomachine, the module comprising in particular a line of shafts comprising the input shaft of the reduction gear which must mesh with the sun gear of the reduction gear.

The sun gear of the reduction gear forms a shaft or a portion of a shaft which is intended to be coupled to this input shaft by a male/female spline engagement. In general, the sun gear forms a female shaft with inner splines and the input shaft forms a male shaft with outer splines. The splines of the shafts are straight and extend along the longitudinal axis of the turbomachine, so that the shafts are engaged with each other by axial translation of the shafts towards each other.

The above-mentioned upstream module is relatively heavy due in particular to the mass of the reduction gear which can reach 200 kg or even more. In the case of a horizontal assembly, the reduction gear is cantilevered at the end of the fan shaft and even if this shaft is very concentric with the input shaft, the reduction gear, due to its mass, slightly deforms the fan shaft, which may lead to misalignment of the reduction gear and its input shaft. This phenomenon may be accentuated or generated by radial clearances between the engaging toothing in the reduction gear.

The simplest way to avoid this phenomenon is to assemble the modules vertically. In this way, the mass of the reduction gear no longer causes the fan shaft to bend. The inner clearances in the reduction gear will also have less influence.

When engaging the male shaft into the female shaft, there is a risk of damage to the axial ends opposite to the splines if the male and female splines are not perfectly positioned with respect to each other. Due to the mass of the upstream module, a translation of this module, even at low speed, generates an inertia which may damage the contact areas at these ends. These damaged contact areas can more easily cause crack initiation or visual indications, which could lead to more inspection/validation work or part changes.

In some cases, these contact areas are not easily controllable. There is therefore a risk of damaging the splines and not being able to check their condition after assembly.

This invention proposes an improvement of this technology, which is simple, effective and economical, and makes it possible to guarantee an optimal positioning of the splines of the shafts during their insertion.

DISCLOSURE OF THE INVENTION

The invention provides a shaft assembly for an aircraft turbomachine, comprising a first outer shaft and a second inner shaft, the first outer shaft being intended to be engaged axially on the second shaft and comprising inner longitudinal splines for coupling with outer longitudinal splines of the second shaft, characterized in that:

the first shaft comprises, upstream of the inner splines with respect to the direction of engagement, an annular row of inner guide teeth, the inner teeth being axially aligned with the inner splines and having in cross-section a shape and dimensions similar to those of the inner splines, and the second shaft comprises, upstream of the inner splines with respect to the direction of engagement, an annular row of outer guide teeth, the outer teeth being axially aligned with outer splines and having in cross-section a shape and dimensions similar to those of the outer splines, and in that when the first and second shafts are in the coupling position, the inner and outer splines are engaged in one another and cooperate with each other in an axial coupling area, the inner and outer teeth being situated outside this coupling area.

It is therefore understandable that the teeth are intended and designed to ensure the centring of the shafts during its mounting but also to be subjected preferentially to shocks and stresses during the mounting. If shocks occur between the shafts during the mounting, they will be situated at the level of the teeth, which may eventually be damaged. However, this will not affect the health of the shafts nor those of the splines because these teeth are not intended to transmit torque between the shafts. Their centring function is only used during the mounting by inserting the shafts, and disappears once the shafts are in the coupling position.

The assembly according to the invention may comprise one or more of the following features, taken in isolation from each other or in combination with each other:

when the first and second shafts are being mounted one into the other, their teeth are configured to bear and slide in cooperation with each other at the beginning of the mounting to ensure the axial alignment of the shafts and their splines and to prevent axial ends opposite to the splines from abutting against each other, the inner teeth are separated axially from the inner splines of the first shaft by a distance which is smaller than the axial dimension of the outer teeth, and/or the outer teeth are separated axially from the outer splines of the second shaft by a distance which is smaller than the axial dimension of the inner teeth, the inner teeth comprise chamfered peripheral edges on the side opposite to the inner splines, and/or the outer teeth comprise chamfered peripheral edges on the side opposite to the outer splines, at least one of the shafts comprises a number of teeth identical to the number of its splines, at least one of the shafts comprises a number of teeth smaller than the number of its splines, one of the shafts comprises a number of teeth smaller than the number of teeth of the other of the shafts, one of the shafts comprises an annular row of teeth regularly spaced from each other by a pitch equal to twice the pitch between its splines; this forms a specific alternative embodiment of the invention, this pitch being highly dependent on the number of teeth of the splines; the number of teeth can be advantageously arranged so as to always have at least three distinct contacts between the rows of teeth during the mounting, regardless of the relative angular position of the shafts at the beginning of mounting; for example, if one has a spline of more than 150 or 200 teeth, one could imagine having pitches representing the dimensions of 5, 6 or more teeth, the other of the shafts comprises an annular row of pairs of teeth, the teeth of each pair delimiting between them a space for the passage of a tooth of the other shaft.

This invention also relates to an aircraft turbomachine, comprising at least one assembly as described above.

Advantageously, the first and second shafts are a reduction sun gear and a low-pressure shaft or two low-pressure shafts.

This invention also concerns a method of assembling a turbomachine as described above, comprising the steps of:

aligning the shafts with each other, bringing the shafts closer to each other so that the teeth of the shafts cooperate by bearing and sliding until they are positioned to allow their engagement with each other, and the splines of the shafts are axially aligned so that they can be fitted into each other without risk of contact, and moving the shafts into each other to their coupling position, in which the splines cooperate with each other in an axial coupling area, the teeth being situated outside this area and therefore not intended to participate in the transmission of a torque between the shafts.

DESCRIPTION OF THE FIGURES

The invention shall be better understood and other details, features and advantages of the invention shall appear when reading the following description made as an example, by reference to the attached drawings, in which:

FIGS. 6 and 7 are schematic perspective views of the inner splines and teeth of a female shaft according to the invention;

FIG. 8 is a schematic perspective and axial cross-section view of a shaft assembly according to the invention;

FIG. 9 is a partial schematic perspective view of the male shaft of FIGS. 4 and 5;

DETAILED DESCRIPTION

Figure 1:
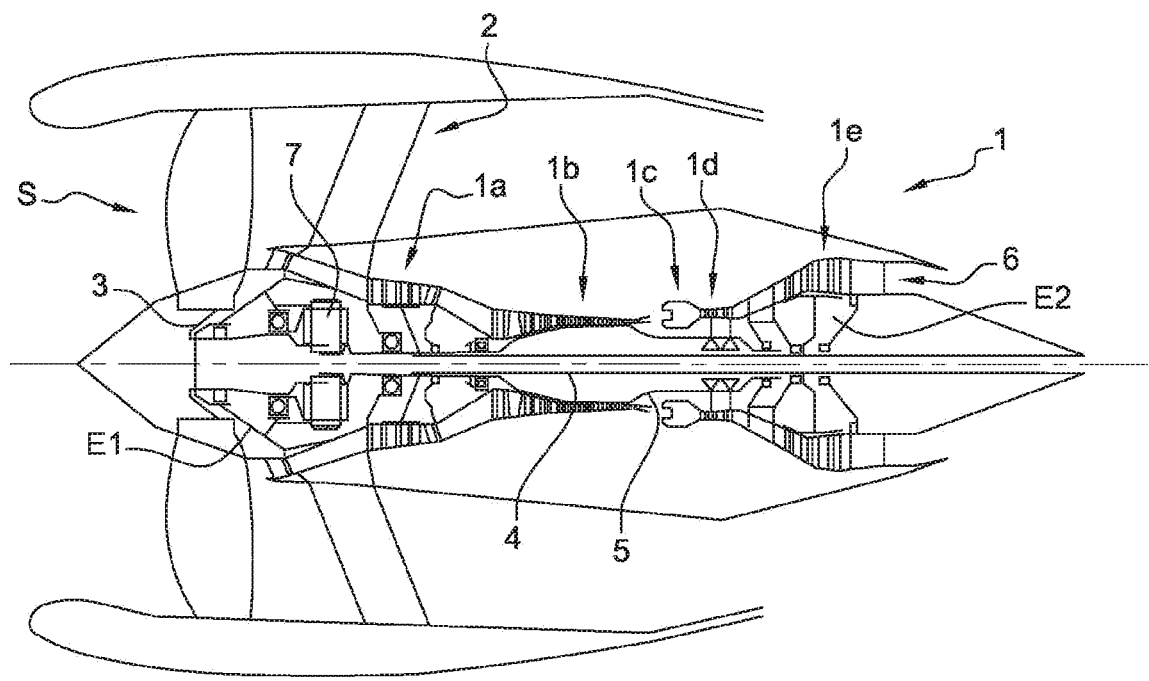
FIG. 1 is a schematic axial cross-sectional view of an aircraft turbomachine.

Referring to FIG. 1, we see a turbomachine 1 with a reduction gear, which conventionally comprise a fan S, a low-pressure compressor 1a, a high-pressure compressor 1b, a combustion chamber 1c, a high-pressure turbine 1d and a low-pressure turbine 1e. The rotors of the high-pressure compressor 1b and the high-pressure turbine 1d are connected by a high-pressure shaft 5 and form a high-pressure (HP) body with it. The rotors of the low-pressure compressor 1a and the low-pressure turbine 1e are connected by a low-pressure shaft 4 and form a low-pressure (LP) body. The fan is, as it is, carried by a fan shaft 3 which is connected by a reduction gear 7 to the LP shaft 4.

The HP and LP shafts extend along an axis which is the axis of rotation of the turbomachine 1. In the rest of the description, the notions of longitudinal or radial, and inside or outside, are relative to this axis.

The turbomachine 1 comprises structural casings. The HP body is held by two structural casings: the inter-compressor casing and the inter-turbine casing, and the LP body is held by at least two structural casings: the intermediate casing 2 and the inter-turbine casing and/or the exhaust casing 6.

The intermediate casing 2 supports bearings of the LP turbine shaft 4 which are housed in a front or upstream enclosure marked E1. The exhaust casing 6 supports bearings of the LP turbine shaft 4 which are housed in a rear or downstream enclosure marked E2.

The enclosures are generally delimited by bearing supports.

Figure 2:
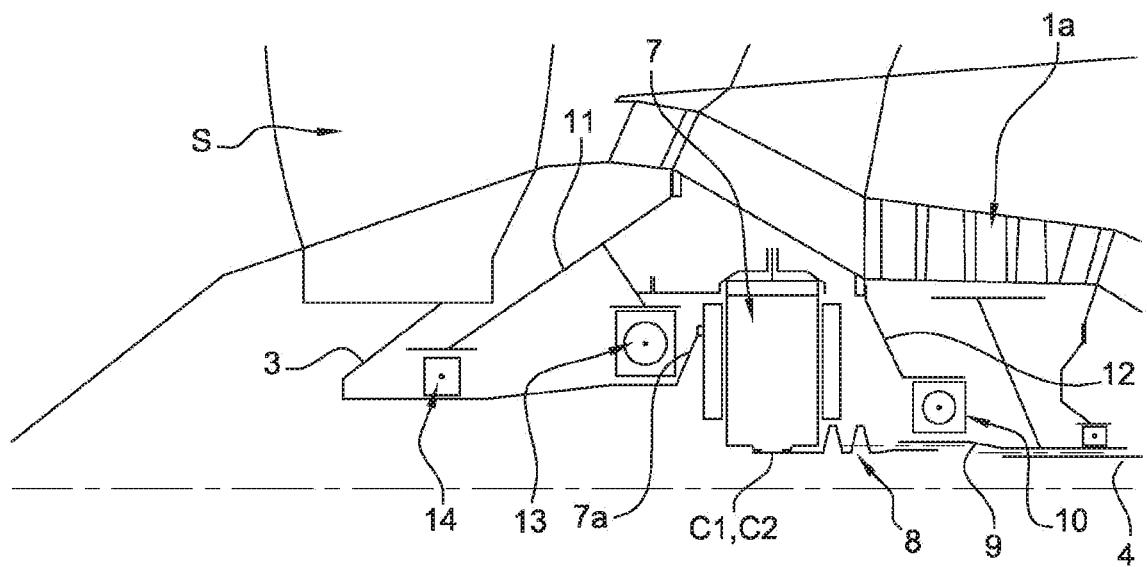
FIG. 2 is a partial schematic axial cross-section view of an aircraft turbomachine.

The reduction gear 7 is here of the epicyclic type. FIG. 2 shows in a very schematic way the space requirement of the reduction gear. The reduction gear 7 consists of a sun gear which is meshed with the planet gears and is coupled via splines C1, C2 with a shaft 8 which can be considered as the input shaft of the reduction gear. The shaft 8 is driven by the LP shaft 4 via a shaft 9 of the LP compressor which is guided by a downstream bearing 10. Alternatively, the shafts 8 and 9 could form a single monobloc shaft.

The shafts 8, 9 and 4 form a LP shaft line. The output torque of the reduction gear 7 is transmitted to the fan shaft 3 via a conventional connection known to the person skilled in the art, such as, for example, a fixing of this fan shaft to the planet carriers forming an output shaft 7a of the reduction gear, in the case of an epicyclic reduction gear. In the case of a planet reduction gear, the fan shaft would be driven by the ring gear. The reduction gear is placed inside the front lubrication enclosure E1.

The enclosure E1 comprises fixed walls and movable walls. The fixed walls of the enclosure E1 comprise an inner wall of the vein of the primary flow, an upstream bearing support 11 and a downstream bearing support 12. The supports 11 and 12 extend towards the inside of the turbomachine and carry the bearing 13 and the bearing 10 respectively. They provide the structure between the casings and the outer fixed rings of the bearings. The movable walls of the enclosure E1 comprise the input 8 and output 7a shafts. The bearings 10, 13, 14 are housed in the enclosure E1. Seals, not visible in the drawings, are provided between the fixed and movable walls and are e.g. labyrinth joints, brush joints, segmented radial joints, etc.

The bearings 10, 13 and 14 as well as the reduction gear 7 are lubricated for proper operation. The oil is supplied by suitable means such as nozzles, oil supply ducts, etc. The bearings 10, 14 are situated at the axial ends of the enclosure E1. The bearing support 11 comprises ventilation holes which allow ventilation air to pass through from the enclosure. The enclosure E1 is configured so that the air-oil mixture, which forms an oil mist inside the enclosure, is contained therein. Between the rotor and stator walls of the enclosure, for example here at the upstream and downstream ends of the enclosure, seals (such as labyrinths) are placed to contain the oil, and an air circuit pressurizes these seals to prevent oil leakage. The enclosure E1 is then pressurized (air continuously enters it, pushing away any oil that may have escaped from the seals by capillary action) and the bearings operate in a mixed oil and air environment. The bearings are supplied by a supply tube and recovery is ensured by a specific recovery tube. To avoid over-pressurization of the enclosure, and to allow a constant flow of incoming air, the inside of the enclosure is vented at a lower pressure than the pressure of the air entering the seals. This air loaded with oil particles, which is evacuated at the level of a pressure well, must first be treated to recover almost all of the oil it carries. To do this, the oiled air will be taken to an oil separator which will separate the air from the oil it carries and discharge the oil-free air outside the engine. This is the principle of oil separation in an enclosure.

Figure 3:
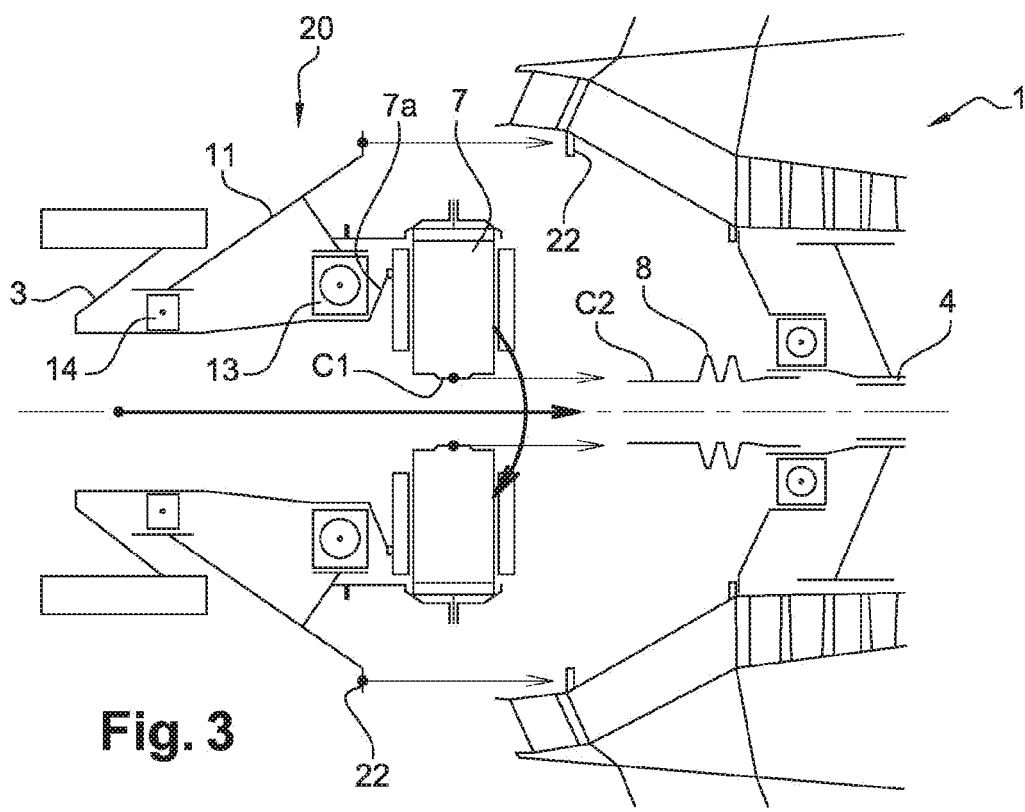
FIG. 3 is a view corresponding to that of FIG. 2 and illustrating a step of mounting the turbomachine.

FIG. 3 shows an assembly stage of the turbomachine 1 in which an upstream module 20 comprising the fan shaft 3, the support 11 of the bearings 13, 14, and the reduction gear 7, are moved in translation along the axis of the turbomachine until the coupling of its sun gear with the shaft 8.

The sun gear of the reduction gear is a female shaft with inner splines, and the shaft 8 is a male shaft with outer splines. The reverse is possible as an alternative. The splines of the shaft are straight and longitudinal. They are complementary and designed to co-operate with each other to ensure the transmission of a torque between the LP shaft and the sun gear of the reduction gear. When the shafts are engaged with each other, the upstream module 20 can be attached to the rest of the turbomachine, for example by means of annular flange for fastening 22 and clamping screws for these flanges. The mounting is preferably carried out with the axis of the turbomachine extending vertically so that the weight of the reduction gear does not cause the fan shaft to bend and so that the inner clearances of the reduction gear can be better managed.

The invention relates more particularly to the assembly of shafts by male-female fitting, FIGS. 1 to 3 and following constituting an example of application of this invention.

Figure 4:
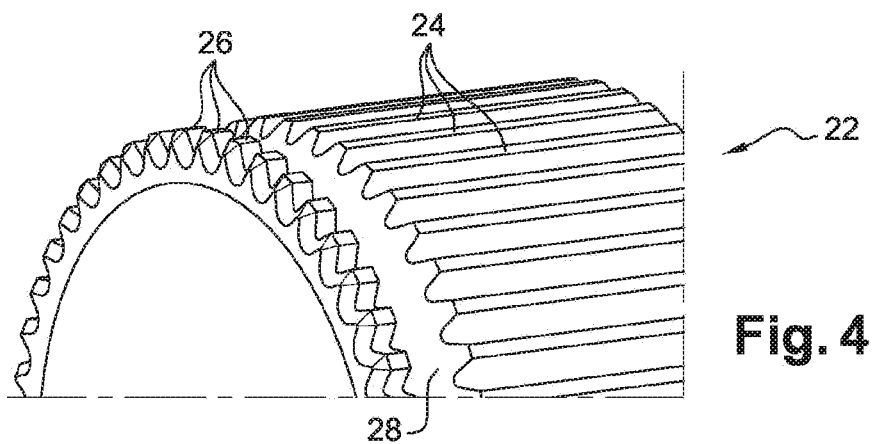
FIGS. 4 and 5 are schematic perspective views of the splines and outer teeth of a male shaft according to the invention.
Figure 5:
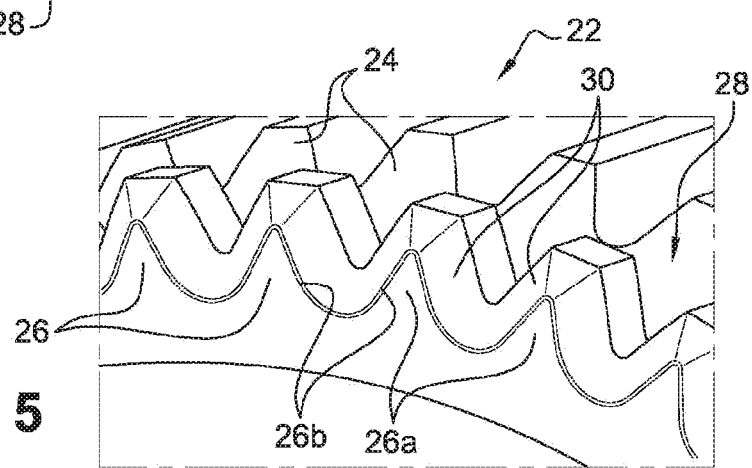

FIGS. 4, 5 and 9 represent a male shaft 22, which is the shaft 8 in the above-mentioned example.

This shaft comprises straight outer splines 24 extending over a length marked L1. The shaft 22 further comprises an annular row of outer guide teeth 26. The outer teeth 26 are axially aligned with the outer splines 24 and are similar in cross-section to the shape and dimensions of the outer splines. In the example shown, the splines 34 have a general trapezoidal cross-sectional shape (FIG. 5). They each have a flat longitudinal apex extending between two preferably flat lateral flanks, inclined at an angle between 30 and 80° to each other. Their longitudinal ends, respectively upstream and downstream, are also bevelled so as to present front and end faces inclined with respect to planes perpendicular to the axis of engagement of the splines and passing through these ends (FIG. 9).

The teeth 26 have here a length marked L2 and are separated axially from the splines 24 by a distance marked L3. In practice, the teeth could be obtained by first making splines of length L1+L2+L3 and then machining an annular groove 28 of length L2 to separate the final splines from the guide teeth.

In order to limit the mass of the shafts, unnecessary sections of material can be limited. For example, the section at the bottom of groove 28 can be limited to the minimum sufficient to hold the teeth 26. For example, the cross-section S1 at the bottom of the groove is at least two times smaller than the cross-section S2 at the bottom of the inter-spline channel which must absorb the torque to be transmitted (FIG. 8).

As can be seen in FIG. 5, the inner teeth 26 comprise chamfered peripheral edges 30 on the side opposite to the inner splines 24, which further facilitate the respective positioning of the shafts. The chamfered edges 30 are advantageously connected to the adjacent surfaces, and in particular to the front faces 26a of the teeth, by means of curved fillets 26b in order to eliminate sharp edges and limit the risk of contact damage. The fillets 26b are in the form of rounded convex (FIG. 5).

As is the case with the splines, the teeth have their upstream ends bevelled so that their front faces 26a are inclined with respect to a plane perpendicular to the axis of engagement of the splines (FIG. 9). The downstream ends are here unbevelled and comprise end faces perpendicular to the axis of engagement.

The angles of the chamfers are determined to favour the positioning of the workpieces during the fitting operation.

The length and shape of the chamfers, together with the shape of the front face 26a of the teeth 26 (triangular as opposed to the trapezoidal shape of the splines) maximises the probability of the positioning teeth engaging with each other without frontal impact.

FIGS. 6 and 7 show a female shaft 32, which in the abovementioned example is the sun gear of the reduction gear or a shaft integral with the sun gear.

This shaft has straight inner splines 34 extending over a length noted L4. The shaft also has an annular row of inner guide teeth 36. The inner teeth 36 are axially aligned with the inner splines 34 and are similar in cross-section to the outer splines in shape and dimensions. In the example shown, the splines 34 have a general trapezoidal cross-sectional shape (FIG. 7). They each comprise a flat longitudinal apex extending between two preferably flat lateral flanks, inclined at an angle of between 30 and 80° to each other. Their longitudinal ends, upstream and downstream respectively, are furthermore bevelled so as to present front and end faces inclined with respect to planes perpendicular to the axis of engagement of the splines and passing through these ends (FIGS. 8 and 9).

The teeth 36 have a length marked L5 and are axially separated from the splines by a distance marked L6. In practice, the teeth 36 could be obtained by first making splines 34 of length L4+L5+L6 and then machining an annular groove 38 of length L5 to separate the final splines from the guide teeth.

For example, the section S3 at the bottom of the groove 38 is at least two times smaller than the section S4 at the bottom of the channel between two inner splines 34 which must absorb the torque transmitted (FIG. 8). Similarly, the section S1 at the bottom of the groove 28 is, for example, at least two times smaller than the section S3 at the bottom of the channel between two outer splines 24 which must absorb the torque transmitted.

As can be seen in FIG. 7, the inner teeth 36 comprise chamfered peripheral edges 40 on the opposite side to the inner splines 34, which also facilitate the respective positioning of the shafts.

The chamfered edges 40 are advantageously connected to the adjacent surfaces, and in particular to the end faces 36a of the teeth, by connecting fillets 36b in order to eliminate sharp edges and limit the risk of contact damage. The fillets 36b are in the form of rounded convex (FIG. 7). As is the case with the splines, the teeth have their upstream ends bevelled so that their front faces 36a are inclined with respect to a plane perpendicular to the axis of engagement of the splines (FIG. 8). The downstream ends are here unbevelled and comprise end faces perpendicular to the axis of engagement.

The angles of the chamfers are determined to facilitate the positioning of the workpieces during the fitting operation. The length and shape of the chamfers, as well as the shape of the upstream or leading face of the teeth 36 (triangular as opposed to the trapezoidal shape of the splines) maximises the probability of engagement of the positioning teeth with respect to each other without frontal impact.

Advantageously, the distance or length L2 is smaller than the length L4, and the distance or length L5 is smaller than the length L1.

This prevents the teeth of a shaft from being free to rotate in the groove of the other shaft, situated between the teeth and splines of that other shaft. However, L2 is not necessarily smaller than L4 and L5 is not necessarily smaller than L1.

In the example shown, the following prevents the teeth of one shaft from being free to rotate in the groove of the other shaft:
  the inner teeth 36 are axially separated from the inner splines 34 of the first shaft 32 by a distance L6 which is smaller than the axial dimension L2 of the outer teeth 26, and
  the outer teeth 26 are axially separated from the outer splines 24 of the second shaft 22 by a distance L3 which is smaller than the axial dimension L5 of the inner teeth 36.

Only one of these two conditions is sufficient to prevent the teeth of one shaft from being free to rotate in the groove of the other shaft.

FIG. 8 shows an assembly step by inserting shafts 22, 32. The shafts are aligned and then inserted into each other. During the approach phase, the teeth 26, 36 of the shafts can cooperate by pressing and sliding their chamfered edges 30, 40 together until they are positioned to allow them to engage with each other. The splines 24, 34 of the shafts are then axially aligned so that they can be fitted into each other without risk of contact, and the shafts can be moved into each other to their coupling position. In this position, the splines cooperate with each other in an axial coupling area marked Z, which has a total length of approximately L1 or L4 (FIG. 9). The teeth 24, 34 are situated outside this area and do not participate in the torque transmission. Even if they have been damaged during the mounting, there is therefore no risk of cracking or splitting due to the fact that they are axially remote from the area Z.

In the example shown in FIGS. 4 to 9, the number of teeth 24, 34 on the shaft 22, 32 is identical to the number of teeth on the other shaft.

Figure 10:
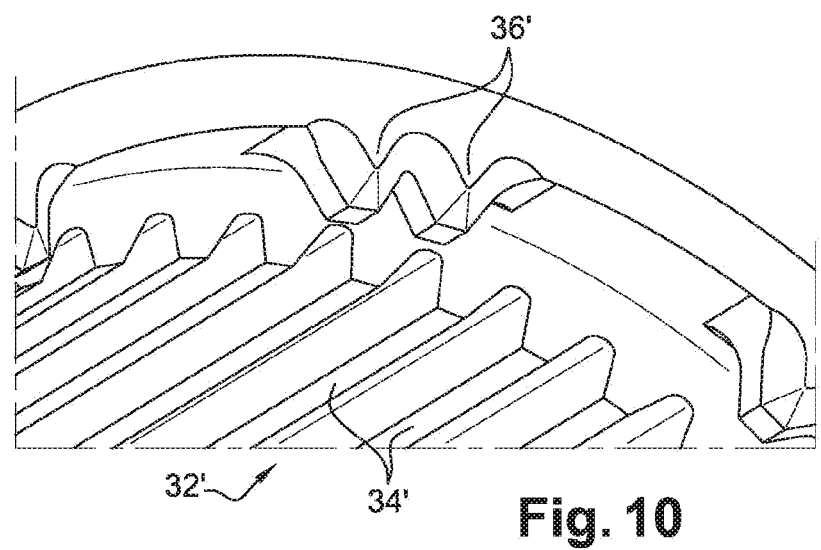
FIG. 10 is a view similar to FIG. 7 and illustrating an alternative embodiment of the invention.
Figure 11:
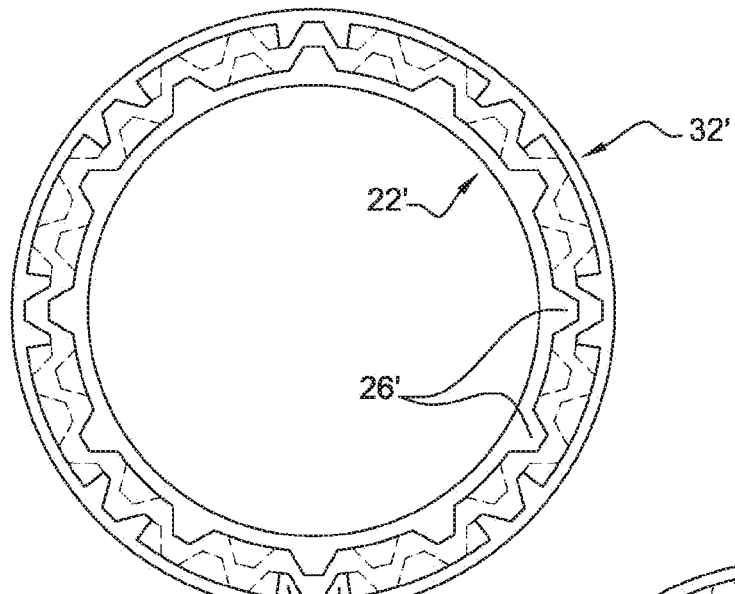
FIGS. 11 and 12 are very schematic views of the shafts and their guide teeth according to the alternative embodiment of FIG. 10, and represent two different angular positions of the male shaft towards the female shaft.
Figure 12:
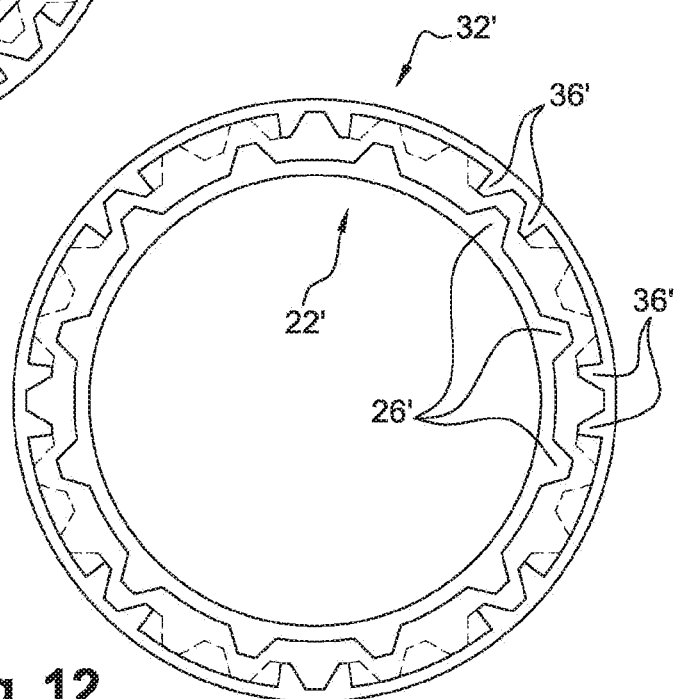

In the alternative embodiment shown in FIGS. 10 to 12, the shafts 22', 32' have a number of teeth 26', 36' smaller than the number of their splines. The inner shaft 22' has a number of teeth 26' smaller than the number of its splines and the number of teeth 36' of the outer shaft 32'. The shaft 22' comprises an annular row of teeth 26' evenly spaced at a pitch equal to twice the pitch between its splines.

The outer shaft 32' has a number of teeth 36' smaller than the number of its splines 34'. The shaft 32' here comprises an annular row of pairs of consecutive teeth 36', the teeth of each pair delimiting between them a space for the passage of a tooth 26' of the other shaft. The pitch between the teeth 36' of each pair is equal to the pitch between the splines 34' of the same shaft.

The splines 24, 34 are configured to transmit significant torque between the shafts.

The limitation of the number of teeth 26', 36' reduces the impact of the presence of the teeth on the mass of the shafts 22', 32'. The excess teeth can be removed from a shaft by machining, for example. Moreover, in the case of the outer shaft, as only part of the teeth of each pair is intended to cooperate with a tooth of the other shaft, which is intended to pass between the teeth of the pair, these teeth 36' can be partly removed to further lighten the shaft 32'. In the example shown, only half of the teeth 36' of each pair are retained.

FIGS. 11 and 12 show that regardless of the angular position of the shafts with respect to each other, there will always be a series of teeth on the inner shaft that will pass between a pair of teeth on the outer shaft. In these figures, the shafts have been represented very schematically by spacing them radially apart from each other in an exaggerated way for clarity. These figures are essentially useful for assessing the number and distribution of the teeth and their distribution around the axis of the turbomachine.

In the abovementioned examples, each shaft comprises 24 splines. This number is of course not restrictive. In FIGS. 11 and 12, the shaft 22' comprises 12 teeth 26' and the shaft 32' comprises 18 halves of teeth 36'.

The number of teeth 26', 36' is also not restrictive. The pitch between the teeth depends strongly on the number of teeth in the splines. The number of teeth 26', 36' can be advantageously arranged so that there are always at least three distinct contacts between these rows of teeth during the mounting, regardless of the relative angular position of the shafts at the beginning of the mounting. For example, if you have a spline with more than 150 or 200 teeth, you could imagine having pitches representing the space required for 5, 6 or more teeth.

In the context of this invention, the assembly of the turbomachine comprises the following steps, preferably in a successive manner, the first four steps being only optional:

assembling a low-pressure compressor module including the low-pressure compressor 1a and the intermediate casing 2, the input shaft 8, to the two preceding modules.

positioning the low-pressure compressor module so that the input shaft 8 is vertically oriented.

assembling a reduction gear module including the reduction gear 7 to the bearing support 11, the fan bearings 13 and 14 and the output shaft 7a.

positioning the reduction gear module above the low pressure compressor module without contact between the modules.

aligning the shafts 22, 32 with each other, which here are the input shaft 8 and the output shaft 7a.

bringing the shafts together in such a way that the teeth 26, 36 of the shafts cooperate by bearing and sliding until they are positioned to allow them to engage with each other, and the splines 24, 34 of the shafts are axially aligned so that they can be fitted into each other without risk of contact, and moving the shafts into each other to their coupling position, in which the splines cooperate with each other in an axial coupling area Z, the teeth 24, 34 being situated outside this area and therefore not intended to participate in the transmission of torque between the shafts. This coupling position is shown in FIG. 9, where it can be seen that teeth 26, 36 are situated on either side of the coupling area.

In the case shown in FIG. 3 where the splines 34, 24 of the shafts 22, 32 form respectively the splines C1 and C2 of the sun gear and the shaft 8, the abovementioned steps allow the assembly of the fan module of the turbomachine, which includes the low pressure compressor module and the reduction gear module. This module is then fixed to one module including the high pressure body and then to another module including the low pressure turbine and the low pressure shaft.

The coupling system described above can be used to couple several pairs of shafts of a turbomachine.

The invention claimed is:

1. A shaft assembly for an aircraft turbomachine, comprising a first outer shaft and a second inner shaft, the first outer shaft being intended to be engaged axially in a coupling position on the second shaft and comprising inner longitudinal splines coupled with outer longitudinal splines of the second shaft, wherein:

the first shaft comprises, upstream of the inner splines with respect to the direction of engagement, an annular row of inner guide teeth, the inner teeth being axially aligned with the inner splines and having in cross-section a shape and dimensions similar to those of the inner splines, and the second shaft comprises, upstream of the outer splines with respect to the direction of engagement, an annular row of outer guide teeth, the outer teeth being axially aligned with the outer splines and having in cross-section a shape and dimensions similar to those of the outer splines, and wherein, when the first and second shafts are in the coupling position, the inner and outer splines are engaged in one another and cooperate with each other in an axial coupling area (Z), the inner and outer teeth being situated outside this coupling area.

2. The assembly according to claim 1, wherein, when the first and second shafts are being in progress mount one into the other, their teeth are configured to bear and slide in cooperation with each other at the beginning of the mounting to ensure axial alignment of the shafts and their splines and to prevent axial ends opposite to the splines from abutting against each other.

3. The assembly according to claim 2, wherein the inner teeth are separated axially from the inner splines of the first shaft by a distance which is smaller than the axial dimension of the outer teeth, and/or the outer teeth are separated axially from the outer splines of the second shaft by a distance which is smaller than the axial dimension of the inner teeth.

4. The assembly according to claim 1, wherein the inner teeth are separated axially from the inner splines of the first shaft by a distance which is smaller than the axial dimension of the outer teeth, and/or the outer teeth are separated axially from the outer splines of the second shaft by a distance which is smaller than the axial dimension of the inner teeth.

5. The assembly according to claim 1, wherein the inner teeth comprise chamfered peripheral edges on the side opposite to the inner splines, and/or the outer teeth comprise chamfered peripheral edges on the side opposite to the outer splines.

6. The assembly according to claim 5, wherein said chamfered peripheral edges of the outer guide teeth are connected to a front face of said outer teeth by curved fillets.

7. The assembly according to claim 1, wherein at least one of the shafts comprises a number of teeth identical to the number of its splines.

8. The assembly according to claim 1, wherein at least one of the shafts comprises a number of teeth smaller than the number of its splines.

9. The assembly according to claim 8, wherein one of the shafts comprises a number of teeth smaller than the number of teeth of the other of the shafts.

10. The assembly according to claim 9, wherein one of the shafts comprises an annular row of teeth regularly spaced from each other by a pitch equal to twice the pitch between its splines.

11. The assembly according to claim 8, wherein one of the shafts comprises an annular row of teeth regularly spaced from each other by a pitch equal to twice the pitch between its splines.

12. The assembly according to claim 11, wherein the other of the shafts comprises an annular row of pairs of teeth, the teeth of each pair delimiting between them a space for the passage of a tooth of the other shaft.

13. An aircraft turbomachine comprising at least one assembly according to claim 1.

14. The turbomachine according to claim 13, wherein the first and second shafts are a reduction sun gear and a low pressure shaft, or two low pressure shafts.

15. A method of assembling a turbomachine according to claim 14, comprising the steps of:
- aligning the shafts with each other,
- bringing the shafts closer to each other so that the teeth of the shafts cooperate by bearing and sliding until they are positioned to allow their engagement with each other, and the splines of the shafts are axially aligned so that they can be fitted into each other without risk of contact, and
- moving the shafts into each other to their coupling position, in which the splines cooperate with each other in an axial coupling area, the teeth being situated outside this area and therefore not intended to participate in the transmission of a torque between the shafts.

16. The assembly according to claim 1, wherein the inner guide teeth are separated axially from the inner splines by an annular groove.

17. The assembly according to claim 16, wherein a section at a bottom of said annular groove is at least two times smaller than a section at a bottom of a channel between two inner splines.

18. A shaft assembly for an aircraft turbomachine, comprising a first outer shaft and a second inner shaft, the first outer shaft being intended to be engaged axially on the second shaft and comprising inner longitudinal splines for coupling with outer longitudinal splines of the second shaft, characterized in that:
- the first shaft comprises, upstream of the inner splines with respect to the direction of engagement, an annular row of inner guide teeth, the inner teeth being axially aligned with the inner splines and having in cross-section a shape and dimensions similar to those of the inner splines, and
- the second shaft comprises, upstream of the outer splines with respect to the direction of engagement, an annular row of outer guide teeth, the outer teeth being axially aligned with the outer splines and having in cross-section a shape and dimensions similar to those of the outer splines,
- and in that when the first and second shafts are in the coupling position, the inner and outer splines are engaged in one another and cooperate with each other in an axial coupling area (Z), the inner and outer teeth being situated outside this coupling area,
- wherein at least one of the shafts comprises a number of teeth smaller than the number of its splines, and
- wherein one of the shafts comprises a number of teeth smaller than the number of teeth of the other of the shafts.

19. A shaft assembly for an aircraft turbomachine, comprising a first outer shaft and a second inner shaft, the first outer shaft being intended to be engaged axially on the second shaft and comprising inner longitudinal splines for coupling with outer longitudinal splines of the second shaft, characterized in that:
- the first shaft comprises, upstream of the inner splines with respect to the direction of engagement, an annular row of inner guide teeth, the inner teeth being axially aligned with the inner splines and having in cross-section a shape and dimensions similar to those of the inner splines, and
- the second shaft comprises, upstream of the outer splines with respect to the direction of engagement, an annular row of outer guide teeth, the outer teeth being axially aligned with the outer splines and having in cross-section a shape and dimensions similar to those of the outer splines,
- and in that when the first and second shafts are in the coupling position, the inner and outer splines are engaged in one another and cooperate with each other in an axial coupling area (Z), the inner and outer teeth being situated outside this coupling area,
- wherein at least one of the shafts comprises a number of teeth smaller than the number of its splines, and
- one of the shafts comprises an annular row of teeth regularly spaced from each other by a pitch equal to twice the pitch between its splines.

\* \* \* \* \*